US008173799B2

(12) United States Patent
Gillette et al.

(10) Patent No.: US 8,173,799 B2
(45) Date of Patent: May 8, 2012

(54) RAW COTTON LINTERS COMPOSITION, METHOD OF MAKING, AND USES THEREOF

(75) Inventors: Paul C Gillette, Newark, DE (US); Thomas G. Majewicz, Newark, DE (US); Arjun C. Sau, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 486 days.

(21) Appl. No.: 10/822,926

(22) Filed: Apr. 13, 2004

(65) Prior Publication Data

US 2005/0228174 A1 Oct. 13, 2005

(51) Int. Cl.
*C07H 1/00* (2006.01)
*C07H 1/06* (2006.01)
*C08B 11/00* (2006.01)
*C08B 11/193* (2006.01)

(52) U.S. Cl. ............ 536/124; 536/84; 536/86; 536/127
(58) Field of Classification Search ............ 536/124, 536/84, 86, 127
See application file for complete search history.

(56) References Cited

U.S. PATENT DOCUMENTS

| | | | | |
|---|---|---|---|---|
| 2,636,879 A | | 4/1953 | Branae et al. ........... | 20/231 |
| 2,663,907 A | | 12/1953 | Downing et al. ........ | 18/48 |
| 2,667,480 A | * | 1/1954 | Branan et al. ........... | 536/98 |
| 2,949,452 A | * | 8/1960 | Savage .................... | 536/91 |
| 3,085,087 A | * | 4/1963 | Henry et al. ............. | 536/98 |
| 3,375,245 A | * | 3/1968 | Dearborn ................ | 536/89 |
| 4,455,237 A | | 6/1984 | Kinsley ................... | 210/767 |
| 4,942,888 A | * | 7/1990 | Montoya et al. ......... | 131/359 |
| 5,028,342 A | | 7/1991 | Opitz et al. ............. | 252/8.513 |
| 5,976,320 A | | 11/1999 | Lund et al. .............. | 162/52 |
| 6,093,355 A | * | 7/2000 | Newbury et al. ......... | 264/187 |
| 6,174,412 B1 | | 1/2001 | Paterson-Brown et al. | 162/95 |
| 2002/0103368 A1 | | 8/2002 | Harding et al. ........... | 536/96 |

FOREIGN PATENT DOCUMENTS

| | | |
|---|---|---|
| CN | 1 206 563 | 2/1999 |
| DE | 40 34 709 A1 | 5/1991 |
| WO | WO 8403309 A * | 8/1984 |

OTHER PUBLICATIONS

Carboxymethylcellulose from Cotton Linters, B. Kh. Muinov et al., Uzb. Kim., No. 6, 19 (1983).

* cited by examiner

*Primary Examiner* — Shaojia Anna Jiang
*Assistant Examiner* — Everett White
(74) *Attorney, Agent, or Firm* — Robert O'Flynn O'Brien; Joanne Mary Fobare Rossi

(57) ABSTRACT

A composition of a loose mass of comminuted raw cotton linter fibers has a bulk density of at least 8 g/100 ml and at least 50% of the fibers in the mass passes through a US standard sieve size #10 (2 mm opening). This composition is made by obtaining a loose mass of first cut, second cut, third cut, or mill runs raw cotton linters or mixtures thereof and comminuting the loose mass of raw cotton linters to a size wherein at least 50% pass through a US standard sieve size #10 (2 mm opening). This composition is used to make cellulose ether derivatives.

25 Claims, No Drawings

RAW COTTON LINTERS COMPOSITION, METHOD OF MAKING, AND USES THEREOF

FIELD OF THE INVENTION

This invention relates to a novel composition of raw cotton linters, processes for the preparation of the same, and uses thereof. More particularly, the present invention relates to a high bulk density raw cotton linters and a method of making such a raw cotton linters as well as its utility for preparing industrially useful water-soluble and water-swellable cellulose ether derivatives therefrom.

BACKGROUND OF THE INVENTION

Cellulose ethers represent an important class of commercially important water-soluble polymers (WSPs). Examples of such WSPs include carboxy-methylcellulose (CMC), hydroxyethylcellulose (HEC), methylcellulose (MC) and hydroxypropylcellulose (HPC). By incorporating additional functional groups into such cellulose ethers, a wide variety of mixed cellulose ether derivatives can be produced. Currently, cellulose ethers are manufactured by reacting cellulose with appropriate etherifying reagents. The cellulose material used to prepare cellulose ethers is referred to as "furnish". At present both purified cotton linters and purified wood pulp are used to manufacture cellulose ethers.

The ability of a water-soluble cellulose ether to enhance the viscosity of water is primarily controlled by its molecular weight, chemical derivatization, and substitution uniformity of the polymer chain. For many industrial applications, high molecular weight cellulose ethers giving high solution viscosity are desired to lower their use level in a given application. Hence, technical alternatives have been sought to increase the viscosity of cellulose ether solutions. Approaches to increase solution viscosity of cellulose ethers include non-covalent inter-chain crosslinking by grafting hydrophobic groups onto the cellulose ether backbone as well as ionic crosslinking of the appropriate cellulose ether chains by various suitable ionic agents. However, cellulose ethers containing grafted hydrophobes are more expensive and may not provide high solution viscosity in the presence of various surface-active agents typically present in many water-borne formulations. To crosslink cellulose ethers with a crosslinking agent, however, has limitations as the concentration of crosslinking agent and the crosslinking conditions must be carefully controlled to prevent the formation of excessively crosslinked water-insoluble species. In addition, many crosslinkers are highly reactive and toxic. Since both permanent (i.e. covalent) and temporal (e.g. hydrophobic or ionic) crosslinking ultimately yield nonlinear polymers their rheological characteristics differ from those of their linear analogs. Thus for many industrial applications involving the use of cellulose ethers in aqueous media it is important to prepare high molecular weight cellulose ethers. In principle, this can be achieved by preserving the cellulose molecular weight during the manufacture of cellulose ethers, provided the starting cellulose has very high molecular weight. Unfortunately commercially available cellulose furnishes that are currently used to manufacture cellulose ethers have molecular weights lower than that of naturally occurring cellulose. Hence, they are unsuitable to make high molecular weight cellulose ethers.

Cellulose is a naturally occurring polymer and exists in a fibrous form in plants. Chemically, it is a homopolymer of anhydroglucose units connected through 1,4-beta-glycosidic linkages. Each anhydroglucose unit has three hydroxyl groups that are reactive to etherifying agents. In the natural form, it has the highest molecular weight.

The purest natural cellulose is the cotton lint or staple fiber which on a dry basis consists of about 95 wt % cellulose. However, due to its high cost cotton staple fiber is not used to manufacture cellulose derivatives. Currently, cellulose materials used to manufacture cellulose derivatives are isolated from trees or raw cotton linters. Cellulose fibers obtained by purification of wood are called wood pulps. Due to their low cost these furnishes are the most commonly employed sources of cellulose for the manufacture of cellulose derivatives.

Raw cotton linters have been considered an excellent source of high molecular weight cellulose for over 80 years. Raw cotton linters, commonly referred to as "linters", are short fiber residues left on the cottonseed after the longer staple ("lint") fibers are removed by ginning. Linters are shorter, thicker, and more colored fibers than staple fibers. They, also, adhere more strongly to the seed relative to staple fibers. Linters are removed from cottonseeds using a number of technologies including linter saws and abrasive grinding methods, both of which yield suitable materials. Depending on the number of passes used to remove the linters from the cottonseed, they are called "first-cut", "second-cut" and "third-cut" raw cotton linters. If the linters are removed in one pass or first- and second-cut linters are manually blended in a weight ratio of approximately 1:4, the resulting material is called "mill runs". Mill runs and first-cut raw cotton linters are used in medical and cosmetic applications as well as to make upholstery, mattresses, etc. while second cut cotton linters are typically used to manufacture purified cotton linters or chemical cotton. In general, first-cut cotton linters contain less non-cellulosic impurities than do second-cut cotton linters. The amount of hemicellulose, lignin or colored impurities and foreign matter in the various types of raw cotton linters increases in the following order: First-cut<second-cut<third-cut. Typically, the cellulose content of raw cotton linters is about 69-78 wt % as measured by the American Oil Chemists' Society (AOCS) "bB 3-47: Cellulose Yield Pressure-Cook Method".

Another class of short length raw cotton linters collected from cottonseeds by beating the fiber-laden hulls of the cottonseed in a defibrillator is called "hull fiber". To a lesser extent, acid is sometimes employed to remove linters. Linters resulting from this process are generally less desirable, unless one seeks to make a low molecular weight cellulose derivative, since the acid treatment can lead to molecular weight degradation.

In the past, the use of cotton linters in chemical processes was only after extensive mechanical and chemical cleaning to yield a high purity furnish. Purified cellulose obtained from raw cotton linters is called chemical cotton or purified cotton linters. Given the commercial significance of cotton, it is not surprising that many mechanical separation processes have been developed over the past century to separate lint and linters from other contaminants.

Regrettably, during the isolation and purification of cellulose from raw cotton linters or wood chips significant molecular weight loss of the cellulose occurs depending on the process conditions used to isolate the cellulose. In wood, due to the high concentration of other components, the molecular weight loss during purification is especially acute. In addition, due to oxidation caused by a bleaching process during the purification, undesirable functional groups, such as carboxyl or carbonyl groups are formed on the cellulose backbone and the polydispersity of the cellulose chains changes. Another drawback of purifying raw cotton linters to make chemical cotton or converting wood chips to wood pulp is that the crystallinity and morphology of the "virgin" cellulose fibers change leading to changes in chemical reactivity of the hydroxyl groups present in cellulose. Such an alteration of the cellulose microstructure could lead to changes in its reactivity or accessibility to a modifying agent and/or the formation of modified derivatives having different structures and different behavior in an end-use application. Notably, the processing associated with such purification greatly increases the cost of purified cellulose. Hence, from an economic standpoint, the manufacture of cellulose ethers from raw cotton linters is an attractive alternative.

To manufacture high quality cellulose ethers, it is critical to control the physical properties of the cellulose furnish, such as the level of impurities, surface area (fiber length), and crystallinity. Since cellulose is a semi-crystalline material one of the key issues in the manufacture of cellulose ethers is to make the cellulose hydroxyl groups equally accessible for reaction with the derivatizing agent. Since Mercer's original work on treating cellulose with caustic, a variety of methods have been developed over the past 150 years to render cellulose morphology more accessible to reactants. These approaches fall into three general categories: degradative treatments, mechanical treatments, and swelling treatments. In current commercial processes hydroxyl accessibility and reactivity are achieved by activating cellulose with an alkaline reagent, most typically sodium hydroxide.

Degradative treatments such as exposure of cellulose to a mixture of alkali and oxygen or mechanical means are generally undesirable, since they results in a loss of critical properties (e.g. viscosity) for many applications. Most commercial processes employ both mechanical and swelling treatments in an effort to enhance accessibility of all the cellulose hydroxyls present in the anhydroglucose units.

Although solvent-based syntheses of cellulose ethers in which the cellulose is fully dissolved in a nonreactive solvent are well known in the literature, such approaches are not practiced commercially because of the cost and environmental and recovery issues associated with the solvents. Commercial cellulose derivatization processes make use of heterogeneous reaction conditions by employing nonreactive organic diluents and/or high solids reactors.

In the slurry process, cellulose fibers are suspended (slurried) in a nonreactive organic solvent or a mixture of organic solvents, activated with a base solution, and etherified using the appropriate reagent. Slurry concentration is defined as the weight fraction of cellulose in the total reaction mixture. Typically, existing commercial slurry processes to manufacture cellulose ethers are run at about 4-9 wt % cellulose slurry concentrations using cut purified cellulose fibers. The "hairy" fiber morphology often present in purified cellulose furnishes coupled with their low bulk density precludes them from being handled and uniformly derivatized at greater than 9 wt % slurry concentrations.

The choice and operability of slurry concentration are dictated by the following:
 a) Fiber length of the cellulose,
 b) Bulk density of the cellulose, and
 c) Ability to mechanically stir the cellulose slurry to bring about uniform distribution of reactants and efficient heat transfer.

The water-solubility and performance characteristics of a given cellulose ether are dictated by the slurry characteristics used to make it. In general, high quality cellulose ethers are difficult to make at higher slurry concentrations due to non-uniform modification of the cellulose matrix. In general, slurry processes are preferred to high solids processes to manufacture certain types of cellulose ethers to achieve good stirrability, heat transfer, and quality products (no insolubles) having water-solubility with the least amount of etherification, as measured by the degree of substitution.

In slurry processes, the cellulose slurry concentration dictates the throughput of the cellulose derivatives made. The higher the slurry concentration the higher the throughput and, hence, the lower the manufacturing (mill) cost. Thus, from an economic point of view, the ability to make high molecular weight cellulose ethers at higher slurry concentrations than currently being practiced is desirable.

In the high solids process, the cellulose is activated with a base solution with little or no organic solvent to form a paste followed by etherification. In general, it is more difficult to obtain a uniform reaction of the etherifying agent in high solids processes due to the difficulties in achieving uniform mixing/distribution of reagents. In slurry processes, the free nonreactive liquid diluent provides a low viscosity medium to aid in the mixing of reactants. In both processes, reduction of fiber length improves mixing of reagents.

One of the drawbacks of the slurry process to manufacture cellulose ethers in an economical way is the inability to make cellulose ethers at greater than 9 wt % slurry concentration. In principle, by substantially reducing the fiber length of cellulose by cutting, it is possible to make cellulose ethers at slurry concentrations greater than 9 wt %. However, extensive cutting of cellulose required to shorten the fiber length is expensive and occasions molecular weight loss of the cellulose. In many applications, the molecular weight loss occurred during cutting of cellulose is undesirable as it calls for higher use level of the cellulose ether to achieve certain application properties. Another consideration for commercial processes is reactor loading: In order to maximize production output, it is desirable to produce as much product as possible for a given charge of the reactor. One of the means for addressing these issues involves cutting the cellulose fibers to increase bulk density. This approach permits increased reactor loading as well as improved mixing within the reactor.

A variety of approaches have been proposed to increase the bulk density of cellulose fibers by shortening fiber lengths. One approach for increasing the bulk density of cellulose fibers involves cutting or comminuting. U.S. Pat. No. 5,976, 320 discloses a process of producing paper pulp by suspending in water a fibrous material such as cotton fiber and sending to a refiner, such as a conical or disk refiner in which the fiber material is beaten and thereby shortened and fibrilled. The shortened fiber material is then bleached and processed into a homogeneous paper pulp.

Another approach to increase the bulk density of cellulose and increase the solution rheology of cellulose ethers prepared from cellulose pulp is described in U.S. patent application No. 2002/0103368 A1. The invention involves a method of preparing cellulose floc comprising the steps of (a) obtaining mercerized and recovered cellulose pulp, and (b) treating the mercerized pulp to form the cellulose floc. The cellulose floc prepared by this method was found to have a higher bulk density than cellulose floc prepared from similar non-mercerized floc. The solution viscosity of carboxymethylcellulose (CMC) produced from mercerized and recovered cellulose pulp is significantly greater than that produced from non-mercerized cellulose pulp.

U.S. Pat. No. 2,663,907 discloses a process in which cellulose is embrittled at elevated temperature and converted to high density powder by passing it through two rotating rolls under high pressure. Unfortunately, this particular process results in degradation of the cellulose chains, with the resulting low molecular weight cellulose furnish being unsuitable as a feedstock for the manufacture many cellulose derivatives.

Jet mills have been utilized to reduce the particle size of cellulose and cellulose ethers, although in the case of linters the degree of polymerization noted in an example decreased by 26 wt %. However, this approach causes significant loss of molecular weight of cellulose when cotton linters are milled.

As part of a process for producing tissue paper, Paterson-Brown et al. in U.S. Pat. No. 6,174,412 B1 disclose a process for preparing cotton linter-based pulp in which the linters are initially mechanically cleaned, digested with caustic, bleached, and refined with a Hollander type beater over a period of several hours until the average fiber length is within the range of 0.3-3.0 mm.

Finely powdered or cut celluloses have been previously used in both batch and continuous processes to form activated cellulose that is then subsequently reacted with appropriate reagents to form a variety of cellulose derivatives.

Methylcellulose and its mixed hydroxyethyl- or hydroxypropyl-ethers prepared from raw cotton linters have been disclosed. German Patent Application No. 4,034,709 A1 describes the preparation of high molecular weight methylcellulose, ethylcellulose and hydroxyalkyl alkyl celluloses from raw cotton linters. U.S. Pat. No. 5,028,342 describes the use of a mixture of 20 to 80% by weight of carboxymethyl cellulose and 80 to 20% by weight of at least one polycarboxylic acid selected from a homopolymer of acrylic acid, a homopolymer of methacrylic acid, and/or copolymer of acrylic acid and methacrylic acid and/or salts thereof in drilling muds. It was mentioned that the low viscosity, crude (technical grade) carboxymethylcellulose (CMC) (DS about 0.9-1.3) was obtained from raw cotton linters and/or wood cellulose by the slurry process. However, the details of the preparation of the CMC and the slurry concentration used to prepare the CMC were not disclosed.

While some of the above publications describe the preparation of various types of cellulose ethers from raw cotton linters, none of them describes the preparation of cellulose ethers from high bulk density raw cotton linters. Such materials provide a unique composition that are especially well suited for the commercial manufacture of premium quality cellulose derivatives at greatly reduced cost using both slurry and high solids processes since they permit increased utilization of plant assets without additional investment.

SUMMARY OF THE INVENTION

The present invention is directed to a composition comprising a mass of unpurified raw cotton linter fibers that
a) has a bulk density of at least 8 g/100 ml and
b) at least 50 wt % of the fibers in the mass have an average length that passes through a US sieve screen size #10 (2 mm opening).

The present invention further relates to a process for making the mass of unpurified raw cotton linters noted above comprising
a) obtaining a loose mass of first cut, second cut, third cut and/or mill run unpurified, natural, raw cotton linters or mixtures thereof containing at least 60% cellulose as measured by AOCS Official Method Bb 3-47 and
b) commuting the loose mass to a length wherein at least 50 wt % of the fibers pass through a US standard sieve size #10.

The present invention also comprehends a process for making a cellulose ether derivative using as a starting material the above-mentioned cut loose mass of unpurified natural, raw cotton linters. The cellulose ether derivatives that can be prepared using the cut mass of unpurified natural raw cotton linters include, but are not limited to carboxymethylcellulose (CMC), hydrophobically modified carboxymethylcellulose (HMCMC), methylcellulose (MC), ethylcellulose (EC), hydroxyethylcellulose (HEC), methylhydroxypropylcellulose (MHPC), methylhydroxyethylcellulose (MHEC) methylethylhydroxyethylcellulose (MEHEC), hydroxypropylcellulose (HPC), ethylhydroxyethylcellulose (EHEC), hydrophobically-modified hydroxyethylcellulose (HM-HEC), carboxymethylhydroxyethylcellulose (CMHEC), hydrophobically-modified ethylhydroxyethylcellulose (HMEHEC), and hydrophobically modified hydroxypropylcellulose (HMHPC).

DETAILED DESCRIPTION OF THE INVENTION

It has been surprisingly found that the present invention provides a number of improvements relative to existing approaches for the production of high quality cellulose derivatives suitable for a wide range of applications. In particular, the present invention eliminates costly purification of raw cotton linters and, thus, provides cellulose ether manufacturers the means of significantly reducing manufacturing costs. An additional surprising benefit of the present invention is that it can provide unique composition comprised of high molecular weight cellulose materials suitable as feedstock for the production of cellulose derivatives. These short fiber length materials have unexpectedly high bulk density that allows one to manufacture cellulose ethers with enhanced plant production throughput thereby leading to further reduced mill cost.

To decrease mill cost, manufacturers of cellulose derivatives continually seek to:
(1) lower raw material costs without sacrificing product performance,
(2) increase production capacity without additional capital investment, and
(3) decrease costs through reduced energy consumption.

The present invention achieves all of these objectives for the manufacture of cellulose ethers in an economical way through the use of cut raw cotton linters having unique composition. Raw cotton linters offer considerable economic savings relative to either purified linters or wood pulp and represent a premium molecular weight grade of cellulose since they have not undergone chemical processing that typically leads to polymer molecular weight degradation. In addition to these benefits, it has been unexpectedly found that if the raw cotton linters are cut to shorter fiber lengths that relatively high bulk density cellulose furnishes are produced. This finding is significant, since bulk density has long been known to correlate with slurry stirrability. Without good stirrability, it is not possible to intimately mix derivatizing reactants into the cellulose which ultimately leads to inhomogeneous (non-uniform) products not possessing the desired application properties. It was surprising to find that cut raw cotton linters had unusually high bulk density relative to that of cut chemical cotton or wood pulp.

Because of the enhanced bulk density, cut raw cotton linters can be handled and etherified in a slurry process at a significantly higher cellulose concentration (>9 wt %) leading to increased throughput. The aqueous solution viscosity of resulting cellulose ethers made from raw cotton linters was substantially higher than that of the analogous ones made from the highest molecular weight chemical cotton commercially available.

It has also been unexpectedly found that less energy is required to cut raw cotton linters than purified celluloses to achieve the same particle size distributions. Another aspect of the invention is that less power is required to mix a suspension of cut raw cotton linters than a suspension of comparably comminuted purified cellulose in a mixture of organic diluent and base at a given mixing speed. Smooth mixing of the suspension of cellulose fibers in a mixture of base and a non-reactive organic diluent to swell or activate the cellulose is an important process step in the manufacture of cellulose ethers in a slurry process. Activated cellulose is formed when cellulose is mixed with base, water, and optionally nonreactive organic diluent(s).

More specifically, it has been found that the power required to smoothly mix a suspension of comminuted raw cotton linters in a mixture of base and an organic diluent is 5% lower, preferably 10% lower, and more preferably 15% lower than the power required to mix an analogous suspension of comminuted purified cellulose having the same particle size distribution as that of the comminuted raw cotton linters. These findings are illustrated in the Example section.

There are several practical advantages of this invention: Cutting raw cotton linters to the same fiber lengths that are typically used for either purified cotton linters or wood pulp furnishes would permit manufacturers to increase batch size using the same reactor thereby increasing plant capacity using existing assets. Cost savings could be achieved on the basis of the lower cost of the raw cotton linters itself as well as from reduced operating costs stemming from larger reactor charges. Alternatively, raw cotton linters may be cut to longer fiber lengths than are presently used with purified linters or wood pulp furnishes and the same reactor loading used. Since cutting consumes energy and can lead to cellulose molecular weight degradation, both energy cost savings and improved materials may be realized in this case. Cellulose derivatives produced from these materials have utility in a variety of applications. In the case of regulated industries, it is possible to gain the increased capacity advantages associated with unpurified linters and satisfy regulatory requirements through the use of appropriate purification steps after cellulose derivatization.

Cutting of raw cotton linters has been found to yield a cellulose material composition satisfactory for the preparation of premium quality cellulose derivatives suitable for many applications. Additional processing may optionally be performed to further tailor derivative properties to application-specific requirements. In comparison to purified furnishes, cutting of raw cotton linters yields materials with significantly higher bulk densities when processed under equivalent conditions. This property permits higher reactor loading thereby resulting in higher production capacity without additional capital investment. Alternatively, different cutting conditions may be utilized to produce materials of equivalent bulk density with greater cutter throughput and less molecular weight degradation.

In accordance with this invention, the cellulose present in the fibers of the uncut raw cotton linters should have a lower limit of an intrinsic viscosity (IV) of 15 dl/g, preferably 20 dl/g, and an upper limit of 40 dl/g. After the uncut raw cotton linters have been comminuted in accordance with this invention, the molecular weight of the fibers as determined by IV in the loose cut mass will not have been reduced by more than 20%, preferably 10%, relative to the non-comminuted raw cotton linters. In accordance with the present invention, the fibers in the cut mass of linters have a cellulose content of at least 60 wt %, preferably 70 wt %, and more preferably 75 wt %. The upper limit of the cellulose content in the fibers in the cut mass of raw cotton linters is 95 wt %, preferably 90 wt %.

Raw cotton linters including compositions resulting from mechanical cleaning of raw cotton linters, which are substantially free of non-cellulosic foreign matter, such as field trash, debris, seed hulls, etc., can also be used to prepare cellulose ethers of the present invention. Mechanical cleaning techniques of raw cotton linters, including those involving beating, screening, and air separation techniques, are well known to those skilled in the art. Using a combination of mechanical beating techniques and air separation techniques fibers are separated from debris by taking advantages of the density difference between fibers and debris. A mixture of mechanically cleaned raw cotton linters and "as is" raw cotton linters can also be used to manufacture cellulose ethers. Also, a mixture of mechanically cleaned raw cotton linters or "as is" raw cotton linters and purified cellulose can be used to manufacture cellulose ethers.

Commercial linters production yields baled products formed by high compression bale presses. Although the bales have compressed bulk densities of 40-50 g/100 ml, their fibers are not free-flowing materials that can be readily dispersed in nonreactive diluent solvents. For purposes of the present invention, at least 95 wt % of the cut raw linter fibers should pass through US standard screen size #10, preferably size #18, more preferably size #60. To meet this specification and to produce a high density free-flowing material, it is necessary to further reduce the fiber length.

A wide range of cutting equipment can be used to comminute or cut the raw cotton linters to the desired ranges, including, but not limited to, rotary cutters, hammer mills, ball mills, jet mills, and/or vibration mills. It is preferred that the cutter produces substantially no heat buildup and cutting can be carried out under an inert atmosphere to prevent oxidative degradation. A preferred means involves the use of a Netzsch Condux® Cutting Granulator CS. Such cutting will lead to an increase in the bulk density of the material relative to that observed for a previously uncompressed sample. For extremely molecular weight sensitive applications, cryogenic grinding may be utilized to both reduce temperature and maintain an inert atmosphere in the cutting chamber.

In accordance with this invention, the bulk density of the raw cut cotton linters should have a lower limit of at least 8 g/100 ml, preferably 12 g/100 ml, and more preferably 20 g/100 ml. The upper limit should be about 75 g/100 ml, preferably 60 g/100 ml, and more preferably 50 g/100 ml. The loose mass of the cut raw cotton linters can be either dry or wet. The term "dry" herein refers to a loose mass of fibers that contains no more than 10 wt % of moisture. In other words, these fibers will feel dry to the touch. The term "wet" herein refers to a loose mass of fibers that contains greater than 10 wt % of moisture. These fibers should feel wet and in certain instances will have a noticeable water content.

In accordance with the present invention, at least 50%, preferably 75%, and more preferably 95% of the fibers in the loose mass of the cut raw cotton linters passes through a US standard sieve size #10 (2 mm opening), preferably size #18 (1 mm opening), more preferably size #35 (0.5 mm opening), and yet more preferably #60 (0.25 mm opening).

In accordance with the present invention, a process for making the mass of cut unpurified raw cotton linter fibers includes
  a) obtaining a mass of unpurified, natural, raw cotton linters of first, second, third, or mill run cut fibers, as well as mixtures thereof, and
  b) cutting to a length in which at least 50 wt % of the fibers passes through a US sieve size #10 in a cutter that produces substantially no heat buildup.

It has been found that high molecular weight carboxymethylcellulose (CMC) can be produced from cut raw cotton linters at 10-11 wt % slurry concentrations. The feasibility of making CMC at these concentrations is due to the higher bulk density of the cut raw cotton linters.

The water-solubility and solution quality of the cellulose ethers are dictated by the degree of substitution, substitution uniformity, and the amount of non-cellulosic impurities present in the raw cotton linters. To make cellulose ethers with good water-solubility and solution quality, the process can be run preferably at 11 wt % slurry concentration. However, by increasing the bulk density by grinding and using suitable additives, naturally occurring cellulose fibers can be etherified at greater than 11 wt % slurry concentrations. The use of efficient mixing devices can also be used to etherify naturally occurring cellulose fibers at greater than 11 wt % slurry concentrations.

To prepare various cellulose ethers from raw cotton linters, standard etherifying reagents and typical procedures and reaction conditions used to manufacture cellulose ethers from purified cellulose by slurry processes can be used. The cellulose ethers made may be crude or purified depending on the degree of removal of byproducts from the reaction mixture. The level of byproducts present in the cellulose ether can be controlled by the degree of washing with a suitable solvent. The composition of the wash solvent and the mode of purification of the cellulose ether depend on its chemical composition (degree of substitution and molecular weight). It was surprising to find that the mixing power required during the activation of raw cotton linters cellulose with a base solution was substantially reduced relative to the power required for activation of purified cotton linters or wood pulp.

In accordance with this invention, a process for making a cellulose ether derivative using the comminuted mass of raw cotton linters as a starting material includes
  a) treating the cut mass of raw cotton linters with a base in a slurry or high solids process at a cellulose concentration of greater than 9 wt % to form an activated cellulose slurry,
  b) reacting the activated cellulose slurry with an etherifying agent to form a cellulose ether derivative, and
  c) recovering the cellulose ether derivative product.

The order of treatment of the raw cotton linters with a base solution (step a) and etherifying agent (step b) can be reversed. This invention also comprehends the simultaneous activation and etherification where the base and the etherifying agent are added to the reaction mass at the same time.

In this invention, in the process for preparing ether derivatives, the base can be either organic or inorganic or mixtures thereof. The inorganic bases include sodium hydroxide, potassium hydroxide, calcium hydroxide, barium hydroxide, ammonium hydroxide, lithium hydroxide, and mixtures thereof. The organic bases must be strong and include, but are not limited to, amines and quaternary ammonium hydroxides.

In the preparation of the ether derivatives, the etherifying agent includes alkyl halides (e.g., methyl and ethyl chloride), alkenyl halides (e.g., ethylene and propylene halide), alkylene oxides (e.g. ethylene oxide, propylene oxide, and butylene oxide), glycidyl ethers, metal salts of alpha-halogenoalkanoates, vinyl sulfonates, and mixtures thereof. Other etherifying agents are monochloroacetic acid and salts thereof, butyl glycidyl ether, and glycidyl silane (e.g., 3-glycidoxypropyltrimethoxysilane and 3-glycidoxypropylmethyldimethoxysilane).

Optionally the cellulose ether derivative products can be further processed to increase purity. The further processing can comprise extracting nonpolymeric salts from the cellulose ether product through the use of liquid media in which the cellulose derivative is substantially insoluble.

The process of the present invention produces cellulose ether derivative product that includes carboxymethylcellulose (CMC) hydrophobically modified carboxymethicellulose (HMCMC), methylcellulose (MC), ethylcellulose (EC), hydroxyethylcellulose (HEC), methylethylhydroxethylcellulose (MEHEC), hydroxypropylcellulose (HPC), methylhydroxyethylcellulose (MHEC), methylhydroxypropylcellulose (MHPC), ethylhydroxyethylcellulose (EHEC), methylethylhydroxyethylcellulose (MECHEC), hydrophobically-modified hydroxyethylcellulose (HMHEC), hydrophobically-modified ethylhydroxyethylcellulose (HMEHEC), and hydrophobically-modified hydroxypropylcellulose (HMHPC). The final cellulose ether derivative product reaction mass contains at least 85 wt % of the cellulose derivative. The degree of substitution of the CMC is 0.1 to 2.5. The hydroxyethyl molar substitution (MS) of the HEC is 0.1 to 6. The degree of substitution (DS) of MC is 0.1 to 2.5. The ethyl and methyl DS of MEHEC are 0.1 to 2.5 and the hydroxyethyl MS is 0.1 to 6.

The cellulose ethers of the present invention can be further modified with other etherifying agents to form mixed ether derivatives.

In accordance with the present invention, the cellulose ether derivative can be further modified with cationic groups using appropriate cationic reagents. An example of a cationic reagent is glycidylpropyltrimethylammonium chloride. The cationic reagent can also contain a hydrophobic group, such as an alkyl group containing from 2 to 20 carbon atoms. Examples of cationic derivatives of cellulose ethers include HEC, HMHEC, and CMC reacted with glycidylpropyltrimethylammonium chloride.

The intrinsic viscosity (IV) of the cellulose ethers of the present invention can be further reduced by chemical, mechanical, exposure to radiation sources, and enzymatic means or a combination thereof to meet a particular need in a particular application.

The HEC can be further reacted with a hydrophobic reagent to form hydrophobically modified HEC (HMHEC). The hydrophobic group of the HMHEC or HMEHEC has 2 to 30 carbon atoms. The hydrophobic group of the HMHEC and the HMEHEC can be linear or branched hydrocarbon chains that have 2 to 30 carbons. The hydrophobic group of the HMHEC can be an alkyl moiety having 2 to 30 carbons, an aryl moiety having 5 to 30 carbons, an arylalkyl or alkylaryl moiety having 8 to 20 carbon atoms, or a perfluoroalkyl group having 1 to 15 carbon atoms. A preferred moiety is a hexadecyl (C16) group. The hydrophobic groups of the HMHEC can be mixed hydrophobes wherein the mixed hydrophobic groups of the HMHEC has an alkyl or arylalkyl group with 3 to 18 carbon atoms and another group with 8 to 24 carbon atoms, whereby the difference between the two groups must be at least two carbons.

In accordance with the present invention, the hydrophobic group of the methylhydroxyethylcellulose (MHEC) has a methyl degree of substitution of 0.1 to 2.5 and the hydroxyethyl molar substitution (MS) of 0.1 to 6.

In accordance with the present invention, the ethyl degree of substitution of the ethylhydroxyethylcellulose (EHEC) is 0.1 to 2. The hydroxyethyl molar substitution of the EHEC is 0.1 to 6. The hydroxypropylcellulose (HPC) has a HP molar substitution of 0.1 to 5. The methylhydroxypropylcellulose (MHPC) has a methyl degree of substitution of 0.1 to 2.5 and a hydroxypropyl molar substitution of 0.1 to 6.

The present invention is further illustrated in the following examples, wherein all parts or percentages mentioned are by weight unless otherwise indicated. These examples are given only by way of illustration and are not intended to limit the invention except as set forth in the claims.

Standard Procedures

1. Cutting Cellulose Fibers

Cellulose furnishes were cut using a Netzsch Condux® CS150/100-2 laboratory cutter granulator equipped with different screen sizes. The size of the cellulose fibers collected was controlled by fitting the cutter with a screen of appropriate size. In some cases, multiple cutting passes using different size screens were made to achieve a particular fiber length.

2. Sieve Characterization of Cut Cellulose Fiber Length

Fiber lengths were indirectly determined by placing 200 g of material on an appropriately-sized US Standard Sieve (Appendix 1, ASTM Method E437-85), shaking for 20 minutes using a CE Tyler Model 2A Portable Sieve Shaker, and determining the weight fraction of material that had passed through the sieve.

3. Microscopic Characterization of Cellulose Fiber Length

The fiber length distributions of cut cellulose fibers were characterized by their respective number- and weight-average moments using the following optical image analysis-based procedure:
  a) Approximately 20 mg of the cellulose sample was mixed with about 15 ml of immersion oil to form a fiber-in-oil slurry.
  b) The fiber-in-oil slurry then was stirred for 5 minutes and then placed onto a glass slide.
  c) The slide is examined in cross-polarized light under a stereomicroscope, whose magnification was set at 0.0174 mm per pixel on a ½" CCD monochrome video camera. Cellulose fiber images were acquired at 480× 640 pixel resolution from fields of view determined by a systematic uniform random sampling scheme using a programmable motorized X-Y translation stage controlled by Scope-Pro 4.1 software. Each image was processed and analyzed using Image-Pro Plus 4.5.1 software to obtain measurements of area, aspect ratio, hole area, perimeter, ferret length, and ferret width for each object. The true length of non-straight cellulose fibers was derived from the perimeter parameter. A minimum of 30,000 fibers was measured to derive the fiber length distribution statistics.

4. Measuring Bulk Density of Cut Cellulose Fibers

The bulk density of cellulose fibers and raw cotton linters was determined a LobePharma Electrolab Tap Density Tester (USP) model ETD-1020 as follows:
  1) Determine the (empty) tare weight of a 100 ml USP1 graduated cylinder to within ±0.01 g.
  2) Place ~90 ml of uncompresssed cut fibers in a 100 ml USP1 graduated cylinder.
  3) Place the graduated cylinder in the Tap Density instrument and "drop" for 200 drops at a rate of 300 drops/minute.
  4) The resulting tapped volume is determined visually to within ±1 ml as well as the net mass of the fibers to within ±0.01 g.
  5) Bulk density is calculated by dividing the fiber mass by the tapped volume.

5. Determination of Cellulose Content of Raw Cotton Linters

The cellulose content of raw cotton linters was determined using AOCS Official Method Bb 3-47 which is contained in Appendix 2. This method essentially involves a caustic extraction at elevated temperature and pressure of a raw cotton linters sample in a specially designed reactor.

6. Determination of the Intrinsic Viscosity of Raw Cotton Linters

Intrinsic viscosity (IV) reflects the molecular weight of a polymeric substance. To measure the IV of cellulose, the relative viscosity of a solution of methylol derivative of cellulose in dimethylsulfoxide (DMSO) is measured. The methylol derivative of cellulose is made by reacting cellulose with formaldehyde. Experimentally, 0.08 g of cellulose is solubilized in DMSO with the aid of 0.95 g of paraformaldehyde added to 60 g of DMSO with 5.0% LiCl and heated with stirring at 110° C. for 30 minutes. The paraformaldehyde decomposes into formaldehyde during the sample preparation step, which subsequently reacts with cellulose to form a DMSO soluble methylol cellulose derivative.

The resulting stock solution is diluted with DMSO and water to prepare a solution of methylol cellulose in DMSO with 0.5% LiCl and 3.0% $H_2O$ in the concentration range between 0.007 and 0.008 g/dl. The solutions are analyzed using a Viscotek Y501C Capillary Viscometer thermostatted to 50° C. The outputs of the viscometer are pressure transducer values that allow one to calculate relative viscosities for each dilution. From replicate measurements of the relative viscosity, the cellulose IV is determined according to the single point IV equation of Solomon & Ciuta, J. App. Polym. Sci., 6, 683(1962).

7. Determination of Cutting Energy

Cutting energy is defined as the amount of energy required to cut a given quantity of cellulosic material. The cutting energy is determined by measuring the power consumption associated with cutting the cellulosic material with a Netzsch-Condux CS150/100-2 Model Granulator fitted with an appropriate screen over time. The cutter is modified to permit measurement of motor load power. These measurements are automatically recorded by a computer at a rate of 0.25 Hz. A total of 250 g of cellulose are fed to the cutter at a constant rate over a period of 170 sec. Prior to feeding the cellulose the motor is run for a period of at least 60 seconds to establish "no load" power consumption. The "no load" power is subtracted from the power measured during cutting to determine the cutting power. The cutting power is normalized by the cutting time and quantity of cellulose cut to yield the cutting energy.

8. Determination of Mixing Power

Mixing power is defined as the power required to mix a suspension of a given amount of cellulosic material suspended in a given amount of a mixture of aqueous alkali and organic diluent. The mixing power is determined using an apparatus consisting of a jacketed one liter resin kettle. Temperature is controlled by a Neslab Endocal refrigerated circulating bath Model RTE-8DD. The slurry is stirred using a Lightnin model L1U08F stirrer fitted with a ☐" stirrer shaft fitted with two 3.4" A-310 impellers spaced apart by 1½". The following proportions of ingredients are added to the resin kettle as described by the procedure:

| | |
|---|---|
| Cellulose (dry basis) | 47.2 g |
| Water | 32.6 g |
| Isopropanol | 468.9 g |
| Methanol | 27.8 g |
| Sodium Hydroxide (50% solution) | 52.9 g |

1. Set circulating bath cooling temperature to a value that will yield a slurry temperature of 21° C. and start circulation. If this is the first run of the day, calibrate the motor without the agitator attached according to the manufacturer's instructions. Weigh the solvents and water and then charge. Weigh and charge cellulose.
2. Grease the flange, align shaft, and close resin kettle. Adjust shaft until impellers are resting on the glass bottom and mark the shaft. Adjust shaft to ½ above the mark. Step-up agitation until slurry is mixing (ca. 200 rpm).
3. Inert kettle by applying 10" Hg vacuum and break with nitrogen to atmosphere ten times.
4. Using an addition funnel charge 50% NaOH over a seven minute period.
5. Conduct alkalization for exactly 30 minutes.
6. Step up agitation to 800 rpm in 100 rpm increments to achieve good mixing without splashing. At each speed allow the reading to equilibrate for two minutes before recording speed, temperature, and power.
7. Ramp down from 800 rpm to 200 rpm in 100 rpm increments. Allow the reading to equilibrate for two minutes before recording speed, temperature, and power.

Examples 1 to 7

Cutting Raw Cotton Linters

First, second, and mill run cuts of raw cotton linters obtained from Planters Cotton Oil Mill, Producers Cooperative Oil Mill, and Southern Cotton Oil Co., respectively, were cut and characterized (average fiber length and bulk density) as described above. The bulk density of the cut raw cotton linters collected through various screen sizes is shown in Table 1.

Comparative Examples A to F

Cutting Purified Cotton Linters

Sheeted UVE and HVE purified cotton linters (~95 wt % cellulose and ~5 wt % moisture) obtained from Buckeye Technologies were cut as described above. The bulk density of the cut purified cotton linters that were collected through various screen sizes is shown in Table 1.

Comparative Examples G to L

Cutting Purified Wood Pulp

Examples 1 to 5 were repeated using purified VHV-S wood pulp obtained from Borregaard. The bulk density of the cut wood pulp samples collected through 150 to 450 μm screens ranged from 11.7 to 4.3 g/100 ml. As can be seen from data in Table 1, at the same fiber length, cut raw cotton linters have approximately twice the bulk density of purified cotton linters (UVE cellulose or HVE cellulose) or wood pulps.

Example 8

Carboxymethylation of Second Cut Raw Cotton Linters at 7.5 wt % Cellulose Slurry Concentration To a resin kettle bowl containing a mixture of isopropyl alcohol (IPA) (473 g) and methanol (24 g) was added cut raw cotton linters (52.7 g; "as is" weight) (bulk density 26 g/100 ml) and the mixture was mixed to form a slurry. After sealing the reactor, the cellulose slurry was cooled to 20° C. and agitated at 100-600 rpm to achieve good and uniform mixing. The content of the reactor was rendered inert by five cycles of evacuation (water aspirator) and nitrogen purging to ensure complete removal of oxygen from the reactor. To the well-agitated raw cotton slurry at 20° C. was added sodium hydroxide solution (44.97 g of sodium hydroxide dissolved in 73.4 g of water). After adding the sodium hydroxide solution, the cellulose slurry was stirred at 20° C. for 1 hr to form the activated cellulose.

Then, monochloroacetic acid (MCA) solution (51.53 g of MCA dissolved in 51.53 g of isopropanol) was added to the activated cellulose slurry at 20° C. under a nitrogen atmosphere. The resulting reaction mixture was heated at 70° C. for 1 hr, cooled to room temperature and filtered. The residue

TABLE 1

Cellulose Furnish Cutting Examples

| Example | Cut Furnish | Cutter Screen (um) | Cutting Energy (watt-sec/g) | Number Average Length (um) | Weight Average Length (um) | Bulk Density (g/100 ml) |
|---|---|---|---|---|---|---|
| 1 | 2nd cut linters - Producers Cooperative Cotton Oil Mill | 150 | 102.9 | 334 | 606 | 21.7 |
| 2 | 2nd cut linters - Producers Cooperative Cotton Oil Mill | 200 | 78.1 | 407 | 741 | 17.6 |
| 3 | 2nd cut linters - Producers Cooperative Cotton Oil Mill | 250 | 72.0 | 506 | 905 | 13.2 |
| 4 | 2nd cut linters - Producers Cooperative Cotton Oil Mill | 300 | 67.3 | 463 | 864 | 13.0 |
| 5 | 2nd cut linters - Producers Cooperative Cotton Oil Mill | 450 | 46.9 | 541 | 1,072 | 7.1 |
| 6 | 1st cut linters - Planters Cotton Oil Mill, Inc. | 150 | 102.7 | 367 | 607 | 21.3 |
| 7 | Mill run linters - Southern Cotton Oil Co. | 150 | 106.0 | 253 | 387 | 24.5 |
| A | Purified Linters - Buckeye HVE | 150 | 255.3 | 261 | 494 | 12.4 |
| B | Purified Linters - Buckeye HVE | 200 | 197.9 | 312 | 652 | 9.2 |
| C | Purified Linters - Buckeye HVE | 250 | 175.6 | 315 | 640 | 9.2 |
| D | Purified Linters - Buckeye HVE | 300 | 205.6 | 327 | 740 | 8.4 |
| E | Purified Linters - Buckeye HVE | 450 | 115.7 | 318 | 869 | 4.6 |
| F | Purified Linters - Buckeye UVE | 150 | 280.0 | 202 | 348 | 13.8 |
| G | Wood Pulp - Borregaard VHV-S | 150 | 172.0 | 299 | 543 | 11.2 |
| I | Wood Pulp - Borregaard VHV-S | 200 | 143.3 | 355 | 713 | 8.8 |
| J | Wood Pulp - Borregaard VHV-S | 250 | 106.4 | 433 | 901 | 6.9 |
| K | Wood Pulp - Borregaard VHV-S | 300 | 101.2 | 357 | 809 | 6.3 |
| L | Wood Pulp - Borregaard VHV-S | 450 | 79.1 | 382 | 892 | 4.3 | was slurried in 80% (w/w) methanol/water mixture (800 g) and treated with glacial acetic acid (2.7 g). The resulting slurry was washed three times with 80% (w/w) methanol/water and filtered. The filtered cake was then dried in a fluid bed dryer at 25° C. for 5 min, at 50° C. for 10 min and at 70° C. for 20 min.

The carboxymethylated raw cotton linters (CM-RCL) had a carboxymethyl degree of substitution (DS) of 1.05. The Brookfield viscosity of a 1% solution of the CM-RCL was 7040 cP at 30 rpm at 25° C.

Comparative Example M

Carboxymethylation of UVE Cellulose at 7.5 wt % Cellulose Slurry Concentration

Example 8 was repeated using UVE cellulose (bulk density 11 g/100 ml).

The carboxymethyl DS of the CMC was 1.14. The 1% solution Brookfield viscosity of the CMC was 5560 cP at 30 rpm at 25° C.

Example 9

Carboxymethylation of Second Cut Raw Cotton Linters at 10 wt % Cellulose Slurry Concentration Example 8 was repeated using the following ingredients. The activated cellulose was made using ingredients 1 through 5.
1. Cut second-cut raw cotton linters (bulk density 26 g/100 ml)—69.8 g ("as is")
2. Isopropanol—404.6 g
3. Methanol—22.5 g
4. Water—95.5 g
5. Sodium hydroxide (97% pure)—58.5 g
6. Monochloroacetic acid (99.5% pure)—65.1 g
7. Isopropanol—65.1 g
8. Glacial acetic acid—3.1 g The carboxymethyl DS of the CM-RCL was 0.94. The 1% solution Brookfield viscosity of the CM-RCL was 7300 cP at 30 rpm at 25° C.

Example 10

Carboxymethylation of Second Cut Raw Cotton Linters at 11 wt % Cellulose Slurry Concentration Example 8 was repeated using the following ingredients. The activated cellulose was made using ingredients 1 through 5. This activated cellulose was reacted with monochloroacetic acid to form the CM-RCL.
1. Cut second-cut raw cotton linters (bulk density 26 g/100 ml)—52.7 g ("as is"),
2. Isopropanol—298 g,
3. Methanol—15.9 g,
4. Water—61 g,
5. Sodium hydroxide—37.0 g,
6. Monochloroacetic acid (99.5% pure)—43.5 g,
7. Isopropanol—43.5 g, The carboxymethyl DS of the CM-RCL was 1.08. The 1% solution Brookfield viscosity of the CM-RCL was 6100 cP at 30 rpm at 25° C.

Example 11

Carboxymethylation of Cut First-Cut Raw Cotton Linters at 7.5 wt % Cellulose Slurry Concentration Example 8 was repeated using the cut first cut raw cotton linters (bulk density 22 g/100 ml).

The carboxymethyl DS of the CM-RCL was 1.05. The 1% solution Brookfield viscosity of the CM-RCL was 6760 cP at 30 rpm at 25° C.

Example 12

Carboxymethylation of Cut Third Cut Raw Cotton Linters at 7.5 wt % Cellulose Slurry Concentration Example 8 was repeated using the cut third cut raw cotton linters (bulk density 14 g/100 ml).

The carboxymethyl DS of the CM-RCL was 1.02. The 1% solution Brookfield viscosity of the CM-RCL was 7440 cP at 30 rpm at 25° C.

Comparative Example N

Carboxymethylation of Uncut Second Cut Raw Cotton Linters at 7.5 wt % Cellulose Slurry Concentration Example 8 was repeated with the exception that uncut (as received) second cut raw cotton linters were used as the furnish. During the course of carboxymethylation, the stirrer motor overloaded and shut off thereby preventing any potential mixing of MCA whereupon the run was terminated. The results demonstrated that it was not possible to smoothly mix the activated uncut raw cotton linters.

Comparative Example O

Carboxymethylation of Cut UVE Cellulose at 11 wt % Cellulose Slurry Concentration Example 10 was repeated with the exception that UVE purified linters were used instead of the raw cotton linters. Poor mixing of slurry was observed during a run with ~50% of the material being stuck to the reactor wall.

The carboxymethyl DS of the CMC was 1.15. The 1% solution Brookfield viscosity of the CMC was 5020 cP at 30 rpm at 25° C.

Example 13

Ethoxylation of Cut Second-Cut Raw Cotton Linters

To a Chemco reactor containing a mixture of t-butyl alcohol (611.2 g), isopropanol (28.8 g), acetone (21.6 g), and water (59.07 g) were charged cut second-cut raw cotton linters (80 g on a dry basis). After sealing the reactor, the atmosphere in the reactor was rendered inert by five cycles of evacuation and nitrogen purging. Then, under agitation, 50% caustic solution (44.8 g) was added slowly to the cellulose slurry. The resulting slurry was mixed at 20° C. for 45 minutes and then ethylene oxide (76 g) was added. The resulting mixture was heated at 55° C. for 25 minutes and then at 95° C.

for 30 minutes. Following this, the reaction mixture was cooled to 50° C. and treated with 70% nitric acid (50.4 g). The reaction mixture was subsequently cooled to room temperature and filtered under vacuum. The residue was washed three times with 80:20 (w/w) acetone/water mixture and the purified polymer was dehydrated with acetone. The dehydrated polymer was dried in a fluid bed dryer at 70° C. for 0.5 hour.

The hydroxyethyl molar substitution (MS), which is defined as the average number of moles of ethylene oxide grafted per mole of anhydroglucose unit of the cellulose, of the product was 2.67. The 1% solution Brookfield viscosity of the ethoxylated raw cotton linters was 5620 cP at 30 rpm at 25° C.

Comparative Example P

Ethoxylation of Cut HVE Cellulose

Example 13 was repeated using HVE cellulose.

The hydroxyethyl MS of the hydroxyethylcellulose (HEC) formed was 2.59. The 1% solution Brookfield viscosity of the ethoxylated raw cotton linters was 2040 cP at 30 rpm at 25° C.

As can be seen from the above data, ethoxylation of raw cotton linters afforded a product having higher 1% solution viscosity than the HEC made from purified cotton linters (HVE cellulose).

Comparative Example Q

Preparation of Methylhydroxyethylcellulose (MHEC) from Cut UVE Cellulose

To a Lödige Drais TR 2.5 reactor was added cut UVE cotton linters (312 g). The reactor was then evacuated and purged with nitrogen to remove oxygen from the reactor. Dimethyl ether (256 g), methyl chloride (329 g), and ethylene oxide (52 g) were added to the reactor containing UVE to form a slurry. Finally, 50% sodium hydroxide solution (401 g) was added to the cellulose slurry while maintaining the reactor jacket temperature at 20° C. The resulting mixture was heated to 50° C. and then heated from 50° C. to 87° C. over a period of 40 minutes. After reaching 87° C., the reaction mixture was held at 87° C. for 45 minutes to complete the etherification. Following this, the reactor was vented while holding at 87° C. and subsequently cooled to 20° C. whereupon the contents were removed. The reactor contents were dispersed in 6.6 kg hot water (water temperature 90-95° C.) and the slurry neutralized with 1 N hydrochloric acid to pH 6.7-7.5. The solid product was collected by filtration with the filtrate washed with an additional 6.6 kg of hot water. The MHEC was dried overnight in a nitrogen-purged oven at 80° C.

The methyl degree of substitution (DS) and hydroxyethyl MS of the product were 1.57 and 0.33, respectively. The Brookfield viscosity of a 1% solution was 6,360 cP (spindle 4, 30 rpm, 25° C.).

Example 14

Preparation of Methylhydroxyethylcellulose (MHEC) from Cut Second Cut Raw Cotton Linters Comparative Example Q was repeated using the following ingredients.
1. Cut second cut raw cotton linters—317 g
2. Dimethyl ether—252 g,
3. Methyl chloride—328 g,
4. Ethylene oxide—52 g, and
5. 50% sodium hydroxide solution—393 g The methyl degree of substitution (DS) and the hydroxyethyl MS of the product were 1.57 and 0.34, respectively. The Brookfield viscosity of a 1% solution was 13,500 cP (spindle 4, 30 rpm, 25° C.).

Comparative Example R

Preparation of Methylhydroxyethylcellulose (MHEC) from Uncut Second Cut Raw Cotton Linters Example 14 was repeated with the exception that uncut raw cotton linters were used. Prior to charging the reactor the uncut raw linters were broken apart into ~1 ml tufts. After completion of the reaction cycle the reactor was opened. At that time it was observed that 46 g of unreacted cellulose was hung up in the dosing manifold. This was caused by the low bulk density of the uncut raw linters cellulose furnish.

Example 15

Preparation of Methylhydroxypropylcellulose (MHPC) from Cut Second Cut Raw Cotton Linters A MHPC sample was prepared using a similar procedure as in Comparative Example Q with the following changes to procedure and reactor charges.
1. Cut second cut raw cotton linters—156 g
2. Dimethyl ether—138 g,
3. First methyl chloride charge—105 g,
4. Propylene oxide—15 g,
5. 50% sodium hydroxide solution—267 g, and
6. Second methyl chloride charge—102 g, In this case propylene oxide was used instead of ethylene oxide. The methyl chloride was added in two steps with the second addition occurring after the reactor had been at 80° C. for 18 minutes. After the second addition the reactor was maintained at 80-85° C. for 70 minutes. Sample neutralization and purification were as in Comparative Example Q with the exception that half quantity of hot water was used.

The methyl degree of substitution (DS) and the hydroxypropyl MS of the product were 1.63 and 0.09, respectively. The Brookfield viscosity of a 2% solution was 92,600 cP (spindle 4, 30 rpm, 25° C.).

Example 16

Determination of Mixing Power for Cut Raw Cotton Linters

The mixing power for a sample of second cut raw cotton linters cut through a 450 μm screen was determined at 21° C. by the method specified in the Standard Procedures with the following results:

| Mixing Speed (rpm) | Mixing Power (watts) |
|---|---|
| 800 | 12.1 |
| 700 | 9.9 |
| 600 | 8.5 |
| 500 | 6.5 |
| 400 | 4.7 |

-continued

| Mixing Speed (rpm) | Mixing Power (watts) |
|---|---|
| 300 | 3.1 |
| 200 | 1.6 |
| 300 | 3.1 |
| 400 | 4.7 |
| 500 | 6.5 |
| 600 | 8.5 |
| 700 | 9.9 |
| 800 | 12.1 |

Comparative Example S

Determination of Mixing Power for Cut Purified Cotton Linters

Example 16 was repeated with the exception that Buckeye HVE was substituted for second cut raw linters with the following results:

| Mixing Speed (rpm) | Mixing Power (watts) |
|---|---|
| 800 | 16.2 |
| 700 | 13.5 |
| 600 | 11.0 |
| 500 | 8.7 |
| 400 | 6.8 |
| 300 | 4.8 |
| 200 | 2.9 |
| 300 | 4.8 |
| 400 | 6.7 |
| 500 | 8.6 |
| 600 | 10.6 |
| 700 | 12.6 |
| 800 | 15.3 |

The mixing power for this material is substantially higher than that observed for cut raw linters in Example 16.

Although the invention has been described with referenced to preferred embodiments, it is to be understood that variations and modifications in form and detail thereof may be made without departing from the spirit and scope of the claimed invention. Such variations and modifications are to be considered within the purview and scope of the claims appended hereto.

What is claimed:

1. A process for making a cellulose ether derivative comprising
 a) mixing a composition comprising a loose mass of raw cut cotton linter fibers that
  i) has a bulk density of at least 20 g/100 ml and
  ii) at least 50 wt % of the fibers in the loose mass passes through a US standard sieve size #10 (2 mm opening) as a starting material with a base to form an activated cellulose mixture and,
 b) reacting the activated cellulose mixture with at least one etherifying agent to form a cellulose ether derivative product containing a cellulose ether derivative, wherein mixing power of the activated cellulose mixture is 5% lower than the mixing power of the same process using comparably comminuted purified celluloses, wherein the cutting is carried out in a rotary cutter, wherein the upper limit of cellulose content in the fibers in the cut mass of raw cotton linters is 95 wt %, wherein the molecular weight of the raw cut cotton linter fibers as determined by intrinsic viscosity (IV) has not been reduced by more than 20% relative to non-comminuted raw cotton linters, wherein the loose mass of raw cut cotton linter fibers have a number average length range of 253-541.

2. The process of claim 1, wherein the mixing power of the activated cellulose mixture is 10% lower than the mixing power of the same process using comparably comminuted purified celluloses.

3. The process of claim 1, wherein the mixing power of the activated cellulose mixture is 15% lower than the mixing power of the same process using comparably comminuted purified celluloses.

4. The process of claim 1, wherein the base is selected from the group consisting of sodium hydroxide, potassium hydroxide, calcium hydroxide, barium hydroxide, ammonium hydroxide, lithium hydroxide, strong organic bases and mixtures thereof.

5. Process of claim 1 wherein the base is selected from the group consisting of amines, quaternary ammonium hydroxides, and mixtures thereof.

6. The process of claim 1, wherein the etherifying agent is selected from the group consisting of alkyl halides, alkenyl halides, alkylene oxides, glycidyl ethers, metal salts of alpha-halogenoalkanoates, vinyl sulfonates, and mixtures thereof.

7. The process of claim 1, wherein the etherifying agent is selected from the group consisting of methyl chloride, ethyl chloride, ethylene oxide, propylene oxide, butylene oxide, monochloroacetic acid and salts thereof, butyl glycidyl ether, and glycidyl silane.

8. The process of claim 1, wherein the cellulose ether derivative is selected from the group consisting of carboxymethylcellulose (CMC), hydrophobically modified carboxymethylcellulose (HMCMC), methylcellulose (MC), ethylcellulose (EC), hydroxyethylcellulose (HEC), carboxymethylhydroxyethylcellulose (CMHEC), carboxymethyl hydrophobically modified hydroxyethylcellulose (CM-HMHEC), hydrophobically-modified hydroxyethylcellulose (HMHEC), methylhydroxyethylcellulose (MHEC), methylhydroxypropylcellulose (MHPC), ethylhydroxyethylcellulose (EHEC), hydrophobically-modified ethyhydroxyethylcellulose, (HMEHEC), methylethylhydroxyethylcellulose (MEHEC), hydroxypropylcellulose (HPC), and hydrophobically-modified hydroxypropylcellulose (HMHPC).

9. The process of claim 8, wherein the cellulose ether derivative is carboxymethylcellulose having a degree of substitution of 0.1 to 2.5.

10. The process of claim 1, wherein cellulose ether derivative product is further processed to increase its purity.

11. The process of claim 10, wherein the further processing comprises extracting nonpolymeric salts from the cellulose ether derivative product through the use of liquid media in which the cellulose ether derivative is rendered substantially insoluble.

12. The process of claim 1, wherein the starting material or the cellulose ether derivative product is further processed with a viscosity reducing agent to lower the intrinsic viscosity of the cellulose ether product.

13. The process of claim 12, wherein the viscosity reducing agent is performed by chemical means.

14. The process of claim 12, wherein the viscosity reducing agent is performed by mechanical means.

15. The process of claim 12, wherein the viscosity reducing agent is performed by irradiation.

16. The process of claim 12, wherein the viscosity reducing ac en performed by enzymatic means.

17. The process of claim 1, wherein the cellulose ether derivative product contains at least 65% of the cellulose ether derivative.

18. The process of claim 1, wherein the cellulose ether derivative product contains at least 75% of the cellulose ether derivative.

19. The process of claim 1, wherein the cellulose ether derivative product contains at least 95% of the cellulose ether derivative.

20. The process of claim 1 wherein the starting material is dispersed in a nonreactive organic diluent.

21. The process of claim 20 wherein the nonreactive organic diluent is selected from the group consisting of acetone, methanol, ethanol, isopropanol, t-butyl alcohol, and mixtures thereof.

22. The process claim 21 wherein the nonreactive organic diluent contains water.

23. The process of claim 1, wherein the bulk density of the loose mass of raw cut cotton linter fibers has an upper limit of 75 g/100 ml.

24. The process of claim 1, wherein the bulk density of the loose mass of raw cut cotton linter fibers has an upper limit of 60 g/100 ml.

25. The process of claim 1, wherein the bulk density of the loose mass of raw cut cotton linter fibers has an upper limit of 50 g/100 ml.

* * * * *